US008439096B2

(12) United States Patent
Maltezos

(10) Patent No.: US 8,439,096 B2
(45) Date of Patent: May 14, 2013

(54) TRACTION DEVICE FOR A VEHICLE TIRE

(76) Inventor: Ilias F. Maltezos, West Allis, WI (US)

(*) Notice: Subject to any disclaimer, the term of this patent is extended or adjusted under 35 U.S.C. 154(b) by 190 days.

(21) Appl. No.: 12/800,525

(22) Filed: May 17, 2010

(65) Prior Publication Data
US 2010/0276046 A1 Nov. 4, 2010

Related U.S. Application Data

(63) Continuation-in-part of application No. 11/899,351, filed on Sep. 5, 2007, now abandoned.

(51) Int. Cl.
B60C 27/04 (2006.01)

(52) U.S. Cl.
USPC .......................................... 152/216; 301/41.1

(58) Field of Classification Search .................. 301/38.1, 301/41.1, 45, 46, 47, 50; 152/213 R, 216, 152/225, 226, 227, 228, 229, 230; 446/448, 446/465
See application file for complete search history.

(56) References Cited

U.S. PATENT DOCUMENTS

| | | |
|---|---|---|
| 1,366,810 A | 1/1921 | Kimble |
| 1,605,386 A | 11/1926 | Morris |
| 2,714,042 A | 7/1955 | Kelly |
| 2,913,093 A | 11/1959 | Bevan |
| 3,847,196 A | 11/1974 | Gomez |
| 3,861,752 A | 1/1975 | Thurre |
| 3,918,504 A | 11/1975 | Prokesch |
| 4,089,359 A | 5/1978 | Jones |
| 4,122,881 A | 10/1978 | Hyggen |
| 4,228,838 A | 10/1980 | Zerlauth |
| 4,601,519 A | 7/1986 | D'Andrade |
| 5,010,982 A | 4/1991 | Sedlmayr |
| 5,582,662 A | 12/1996 | Pribysh |
| 5,645,659 A | 7/1997 | Ivan |
| 6,341,635 B1 | 1/2002 | Robeson |
| 6,357,500 B1 | 3/2002 | Preusker |
| 6,450,224 B1 | 9/2002 | Ward |
| 6,655,061 B1 | 12/2003 | Good |
| 6,983,778 B1 | 1/2006 | Pitts et al. |
| 7,174,935 B2 | 2/2007 | Kahen |
| 2004/0089385 A1 | 5/2004 | Kahen |
| 2006/0096683 A1 | 5/2006 | Kahen |
| 2009/0056848 A1 | 3/2009 | Maltezos |

OTHER PUBLICATIONS

PCT International Search report regarding PCT/US08/10310 dated Aug. 30, 2010, 10 pages.
Search Report/Written Opinion dated Sep. 8, 2011 in International Patent Application Serial No. PCT/U32011/036642.
Supplementary European Search Report dated Feb. 22, 2012 in European Application EP 08829124.
International Preliminary Report on Patentability for PCT/US11/36642 dated May 1, 2012.

Primary Examiner — Kip T Kotter
(74) Attorney, Agent, or Firm — Ryan Krumholz & Manion, S.C.

(57) ABSTRACT

A traction device for a tire having a hub for attachment to the tire's wheel. At least one arm extends outwardly from the hub, with the arm attached to a gripping section that is capable of contacting the tire. A reversible, rotatable cam attached to the arm and the gripping section controls the movement of the device.

15 Claims, 15 Drawing Sheets

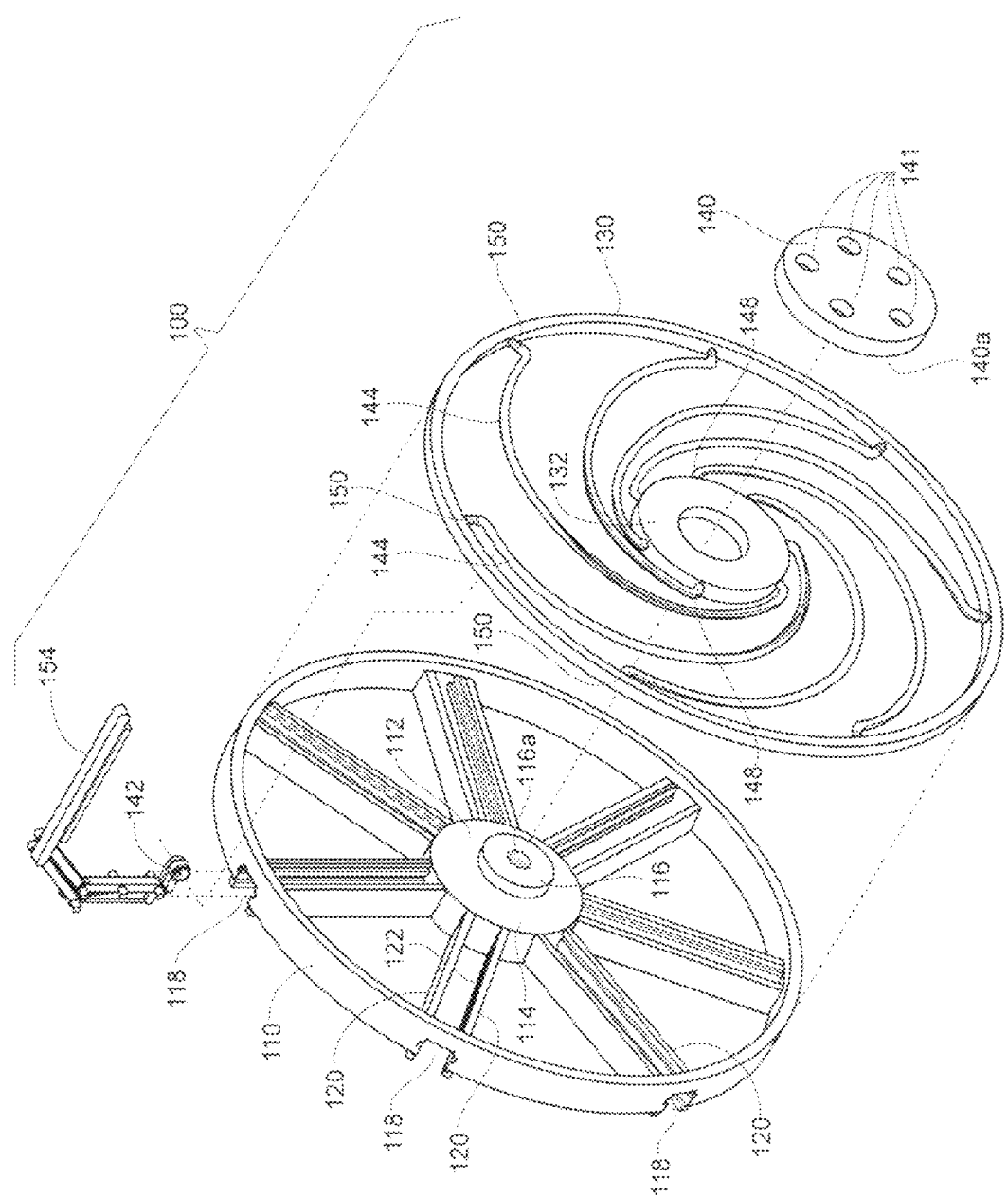

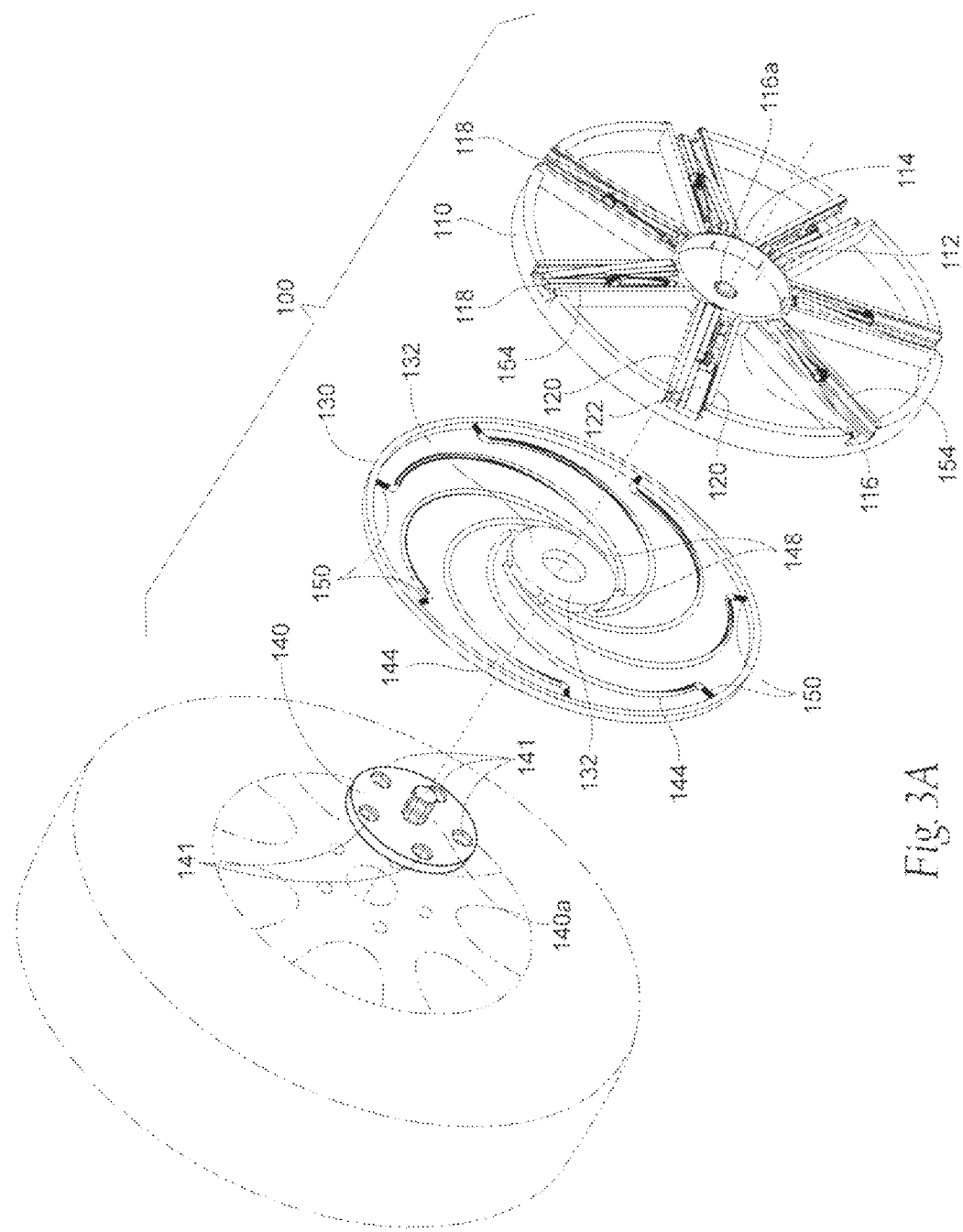

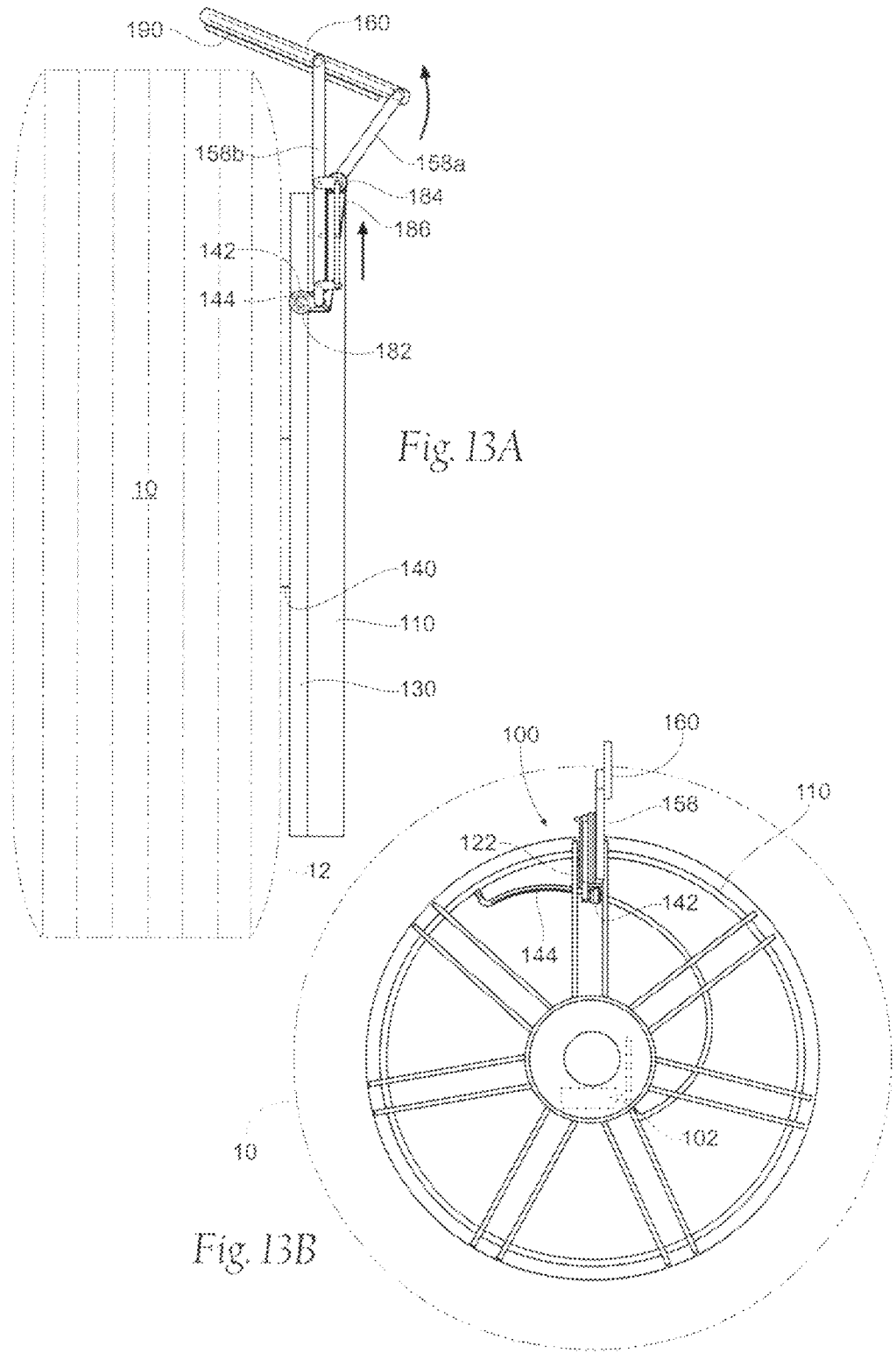

TRACTION DEVICE FOR A VEHICLE TIRE

RELATED APPLICATION

The present application is a continuation-in-part of U.S. application Ser. No. 11/899,351, filed on 5 Sep. 2007 now abandoned.

BACKGROUND OF THE INVENTION

The present invention relates to traction devices for vehicle tires and, more specifically, to traction devices that are attached to the outside of a tire without the need for chains.

When driving in hazardous conditions, such as on snowy or muddy roads, or during rain or snow storms, control of the vehicle can be improved by adding traction to the vehicle. In hazardous driving situations, such as when avoiding a crash or accident on the road or when encountering an unexpected turn in the road, traction can be improved with electronic control systems (ECS), which generally are automatic systems that help balance the power between the wheels of the vehicle. While some vehicle systems are equipped with ESC technology, many vehicles would have further improved operation with additional traction devices.

For instance, chains have been used as added traction for tires. However, chains usually are bulky and hard to attach over the tires, and are not necessarily the most useful devices when being applied to cars and smaller vehicles, as opposed to trucks and tractors. Likewise, storage of chains can be cumbersome.

Other devices have been developed to replace chains that provide similar styles of traction. Generally, these devices consist of a central hub and a plurality of arms that extend outwardly from the hub. The length of the arms usually can be adjusted. The arms have cleats or other devices that are secured on the outside edge of the tires, thereby providing the extra traction. Examples of these types of devices are shown in Ward, U.S. Pat. No. 6,450,224, Pitts et al., U.S. Pat. No. 6,938,778, Robeson, U.S. Pat. No. 6,341,635, and Ivan, U.S. Pat. No. 5,645,659. Though these devices can provide improved traction, they still leave room for improvement.

Each of these devices has arms having adjustable lengths, with the individual arms being adjusted manually. Consequently, it is possible that the arms may not be properly adjusted to tightly grip a tire as needed, which would diminish the usefulness of the devices. It is also possible that the length of each of the arms may be improperly adjusted, or adjusted to lengths that are not a consistent length from one arm to another, which may lead to an unbalanced driving arrangement and require eventual balancing and alignment of the vehicle and tires. Likewise, manually adjusting the arms during inclement weather is not an enjoyable task. It would be beneficial to provide a new traction device for a tire that would be easy to attach and would provide a stable, evenly distributed gripping structure, independent of the drive system of the vehicle.

SUMMARY OF THE INVENTION

The present invention provides a traction device for a vehicle tire that can be used with a wide array and variety of tires and vehicles. The device can be mounted and stored on a wheel of a tire when not in use, without interfering with the driving of the vehicle. The traction device incorporates a cam mechanism or mechanisms to allow the device to properly grip the tire, without manually needing to adjust the device.

The device generally comprises a centrally located hub for attaching the traction device to the tire's wheel. The device has at least one arm, but preferably more arms, that extends outwardly from the hub. Each arm has a gripping section attached to a respective arm. The gripping section has a portion thereof capable of contacting the treaded surface of the tire. The device includes means for moving the gripping section from a stored position to a position making contact with the tire surface. One type of means is a reversible rotatable cam, which is attached to the arm and the gripping section. The cam or cams generally move upwardly and downwardly with respect to the central hub and rotate around and along a respective arm, which thereby causes the gripping section of the arm to move between an active, engaging position with the tire to a stored position. Other types of means include pulleys and similar arrangements.

The device provides an improved traction device for a tire, which can be actuated remotely if necessary. These and other features of the device will become evident with the following description and drawings.

BRIEF DESCRIPTION OF THE DRAWINGS

FIG. 3 is an exploded view of a further embodiment of a traction device in accordance with the present invention.

FIG. 3A is a rear exploded view of the embodiment shown in FIG. 3.

FIG. 13A is a side elevation view of the traction device shown in FIGS. 11A and 12A in a further extended position.

FIG. 13B is a front elevation view of the traction device of FIG. 13A.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
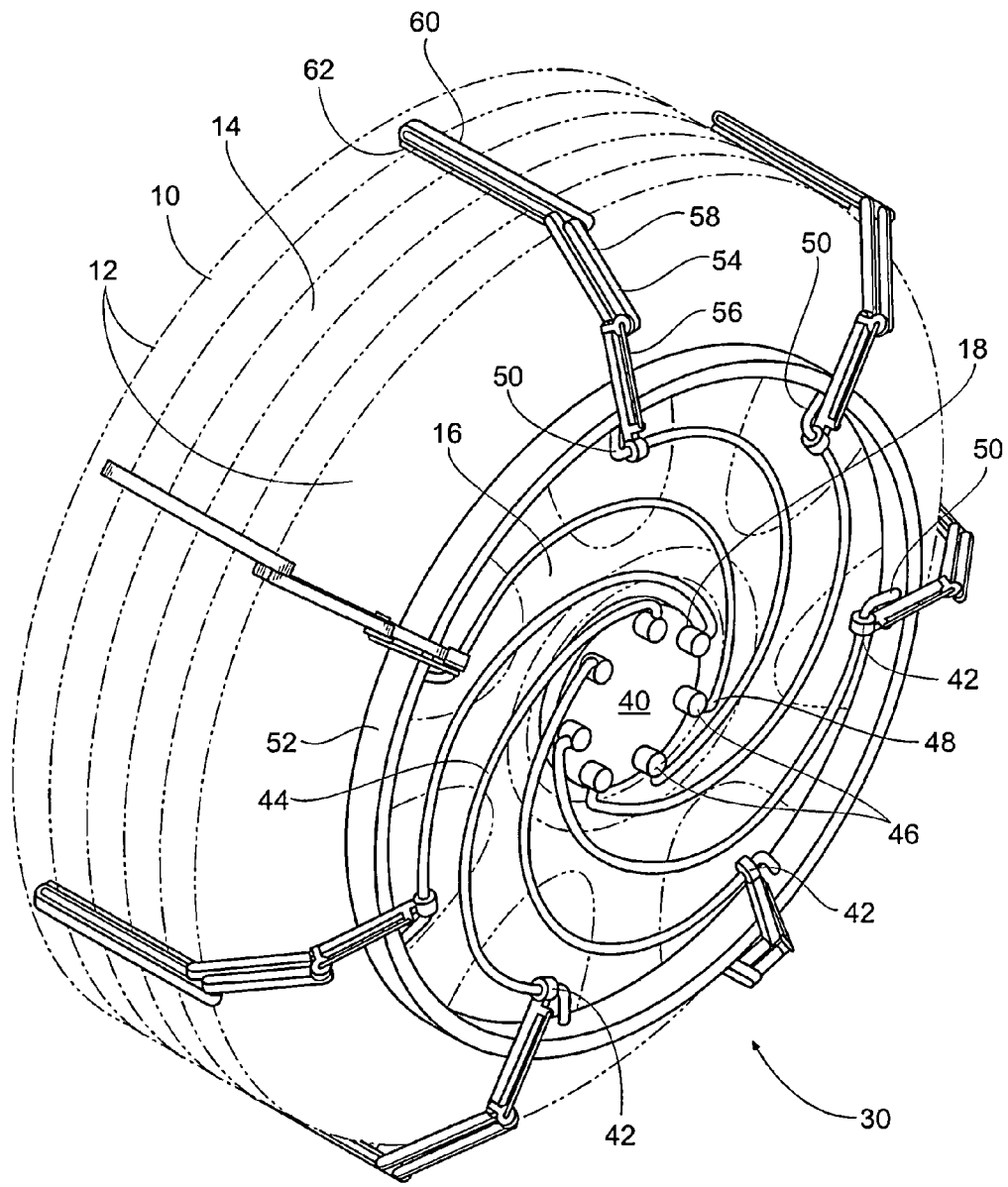
FIG. 1 provides a perspective view of a traction device according to the present invention mounted on a tire in an engaged position with the tire.
Figure 2:
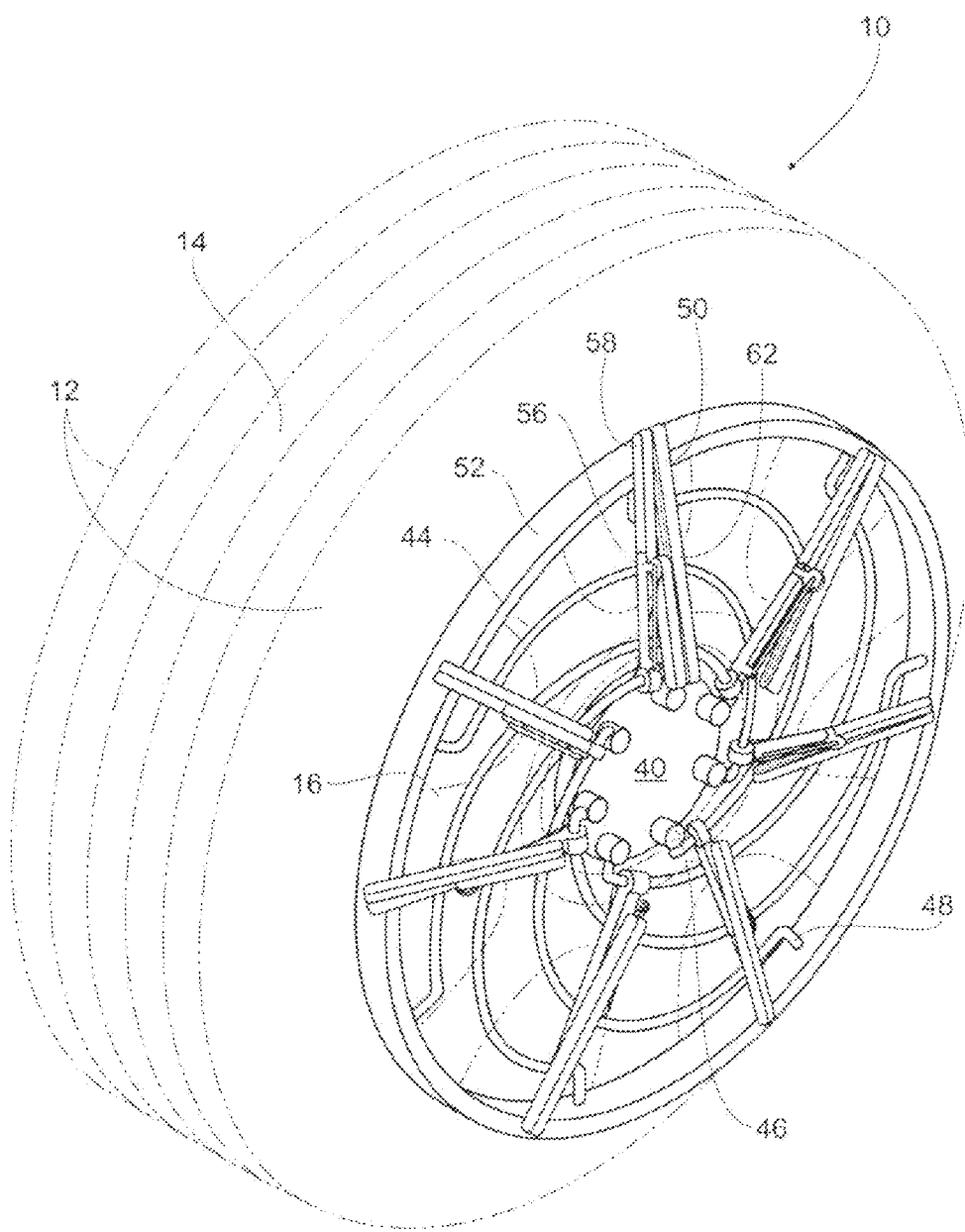
FIG. 2 provides a perspective view of the traction device of FIG. 1 in a retracted position with the tire.

FIG. 1 is a perspective view of a tire 10 supporting a traction device 30 in accordance with the present invention. The device 30 of FIGS. 1 and 2 is generally shown for overall understanding of the concepts of the invention. FIGS. 3-15 will provide a more detailed traction device encompassed by the present invention. The tire 10 comprises a pair of side walls 12 and an outer tread area 14. The tread area 14 should be considered broadly as any outer circumferential area on the tire 10 that rests between the side walls 12. A wheel 16 supports the tire 10. Lug nuts 18 secure the wheel 16 to an axle (not shown). The tire 10 shown in FIG. 1 is merely exemplary of any tire used in connection with the traction device 30. Generally, any tire used on a motor vehicle, including cars, trucks, tractors, and other wheeled vehicles, will be able to use and support the traction device 30.

Still referring to FIG. 1, the traction device 30 comprises an adaptor 40 to rotatably connect the device 30 to the wheel 16. The adaptor 40 is shown as a centrally located hub for the device 30, but could take any shape or design that would not interfere with the regular movement of the tire 10. Preferably, the adaptor 40 will be incorporated and designed to align with the lug nuts 18, but any type of adaptor means that will sufficiently secure the device 30 to the wheel 16, such as bolts, clamps, or other fasteners, should be considered as falling within the scope of the invention. A plurality of arms 44, each having a proximal end 48 and a distal end 50, extends outwardly from the adaptor 40. The device 30 further comprises a plurality of cams 42, which provides the necessary rotation and movement needed to actuate the various components of the traction device 30. The arms 44 are coupled to the adaptor 40 at the proximal end 48 with connectors 46. As previously noted, the connectors 46 preferably are designed to be aligned and mesh with the lug nuts 18, but any design that will connect the arms 44 to the adaptor 40 will fall within the scope of the present invention. The cams 42 are slidably connected to the arms 44, as will become evident with respect to the following drawings. The arms 44 are shown having a curvilinear symmetrical design, with the arms fanning out in a pinwheel type fashion. The design further assists in providing the necessary torque for a tight gripping arrangement when the traction device 30 eventually comes into contact with the tire 10. However, any arm design that does not impede the rotating and gripping process of the traction device 30 will fall within the scope of the present invention.

Referring further to FIG. 1, the distal ends 50 of the arms 44 are secured to an alignment ring 52 that provides further stability and support for the arms 44. Each of the respective arms 44 is coupled to a respective cam member 42. The cam member 42 is connected to a gripping section 54, which comprises a linkage system. As will be shown and described in more detail with respect to the traction device shown in FIGS. 3-15, the gripping sections 54 are pivotally connected to the cam members 42 and will extend to eventually grip the tread area 14 of the tire 10.

FIG. 2 shows the traction device 30 in a retracted or stored position. As the adaptor 40 is rotated, the gripping sections 54 move outwardly to the engaged position of FIG. 1. As shown in FIGS. 1 and 2, the gripping sections 54 generally comprise a linkage system comprised of three sections, a first section 56, a second section 58, and a third section 60. The three sections 56, 58, and 60 preferably are pivotal with respect to one another. The first section 56 is mounted or attached to the respective cam member 42. The second section 58 connects the first section 56 to the third section 60, which has a contact surface 62 that comprises the portion of the gripping section that engages the tread area 14. When the device 30 rotates, the cam members 42 slide outwardly along the respective arms 44, thereby extending the gripping sections 54 further, eventually contacting and gripping the tire 10, as shown in FIG. 1. The traction device 30 grips the tire 10 in a more secure relationship than prior art devices, since the length of each of the individual arms does not need to be adjusted to evenly come into contact and grip the tire 10. Further the traction device 30 provides a strong grip as well, as the rotating force allows added torque to tighten the device 30 against the tire 10, which also occurs in an evenly distributed arrangement.

FIGS. 1 and 2 provide the general principles and concepts of the present invention. That is, FIGS. 1 and 2 provide a general arrangement of a traction device for a tire that can be used and stored on the wheel of the tire, in accordance with the present invention, even when the vehicle is in use. FIGS. 3-15 provide a more detailed traction device 100 according to the present invention. As is shown in FIG. 3 and FIG. 3A, the device 100 generally comprises an attachment ring 130 and a support ring 110. An adaptor 140 (also shown in FIGS. 11A, 12A, and 13A) movably secures the attachment ring 130 and the support ring 110 to one another, as well as providing means for securing the device 100 to the tire. It should be understood that reference to a ring structure does not limit the present invention to any particular shape. As previously discussed lug nuts 18 (see FIGS. 1 and 2) could be used to secure the device 100 to the tire, possibly by insertion through the openings 141. The support ring 110 has a hub 112 that has an outer section 114 and an inner section 116. The inner section 116 extends outwardly from the outer section 114 and is arranged to mate with a central hub 132 located on the attachment ring 130 and also with the adaptor 140.

As stated above, the adaptor 140, the attachment ring 130 and the support ring 110 are capable of moving relatively with respect to one another. Preferably, lateral movement is minimized with respect to the various sections. Generally, any arrangement that will provide rotatable interaction with the sections will suffice for the present invention. As an example, the adaptor hub 140 has a shaft 140a that will mate directly with the inner section 116 of the support ring 110, preferably by mating with an aperture 116a located on the inner section 116. The arrangement allows the attachment ring 130 to rotate with respect to the support ring 110, which, as will be discussed further, below, allows for the necessary movement for the extension and retraction of the gripping sections of the device 100. It should be noted that the use of the shaft 140a to provide the necessary movable and rotatable movement for the device 100 is one example that could be used. Other types of shafts, clamps, pins, or other devices that will allow for rotatable movement will fall within the scope of the present invention.

Referring more particularly to the attachment ring 130, a plurality of arms 144, each having a proximal end 148 and a distal end 150, is shown. It is understood that, unless otherwise noted, reference to an individual arm 144 describes the other arms 144, as well. The proximal end 148 is secured to the central hub 132 and the distal end 150 is secured to the attachment ring 130. The arms 144, which preferably form a pinwheel design, will be described further with respect to FIG. 7.

The support ring 110 is arranged to receive the attachment ring 130 and has substantially the same diameter as the support ring 110. The support ring has a plurality of cutouts 118, which are arranged to receive a respective gripping section 154 and cam member 142. A plurality of struts 120 extend outwardly from the hub 112 to the cutouts 118. Each pair of struts 120 forms a channel 122. As will be described in further detail, the channel 122 houses a cam member 142 and the arm 144, and provides the necessary support for the device 100.

Figure 4:
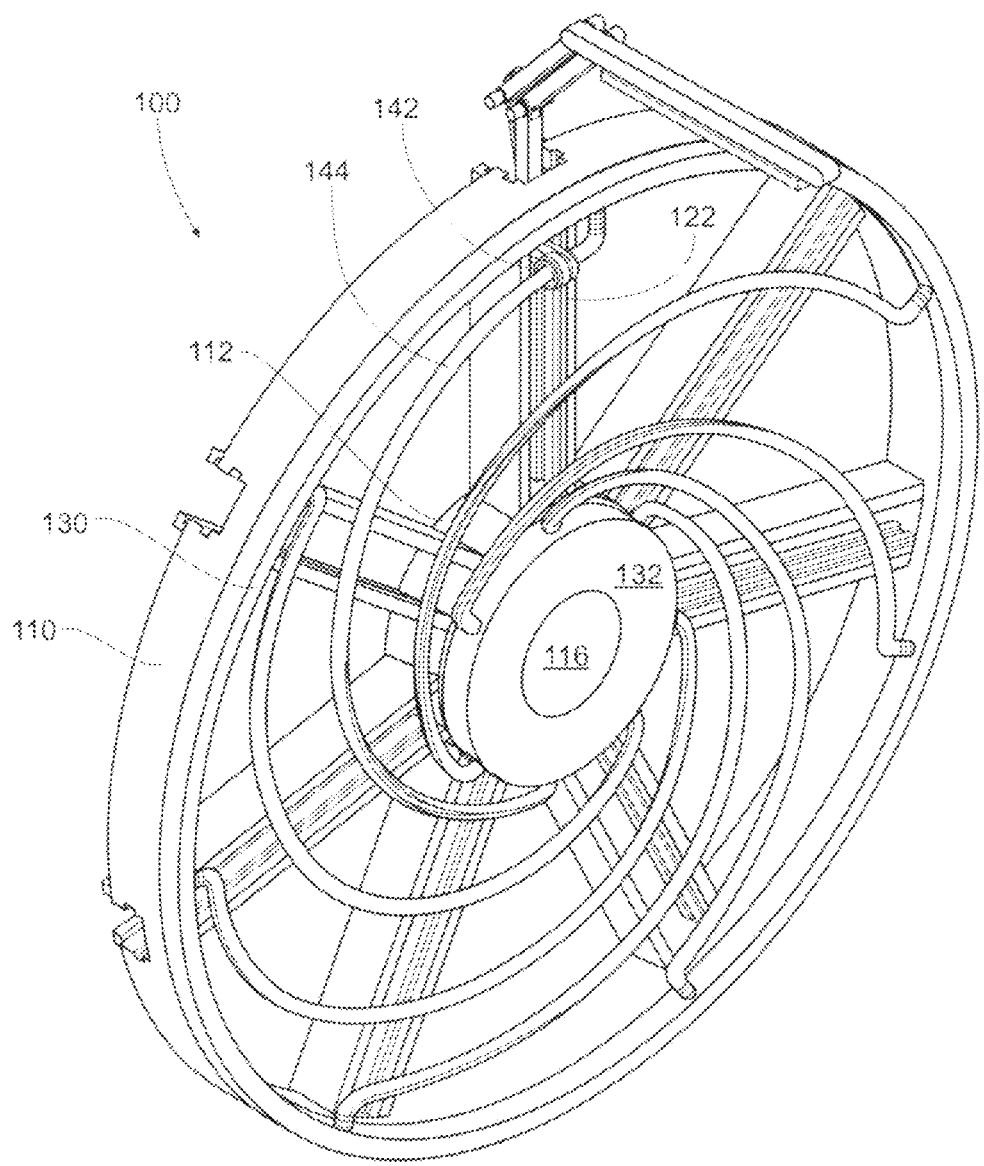
FIG. 4 is a perspective view of the traction device of FIG. 3 shown in an extended position.

FIG. 4 provides a perspective view of the device 100. As shown, the cam member 142 is connected to the arm 144 and rides within the channel 122. It is understood that each of the channels 122 can house such an arm and cam member arrangement. For clarity, only one such arrangement is shown. However, the device 100 would still operate with only one such arrangement. The attachment ring 130 and the support ring 110 are aligned with one another in a sliding fashion. As with the previously described device 30, the device 100 sits upon or is supported by the wheel 16 of the tire 10 (not shown) even when not being used. The attachment ring 130 and the support ring 110 are centrally connected, with the inner section 116 of the hub 112 fitted within the central hub 132 to allow the necessary rotation of the device 100 to extend and retract the gripping sections 154. That is, the attachment ring 130, including the central hub 132, along with the arms 144 are free to rotate within or relative to the support ring 110. As will become more evident in FIG. 11A-FIG. 15, the relative rotation of the ring 130 with respect to the ring 110 allows the cam member 144 to slide along the arm 142 within the channel 122, which forces the gripping section 154 upwardly or downwardly, depending on the direction of rotation. As such, it should be further understood that support ring 110 assists in connecting the arms 142 to the adaptor 140.

Figure 5:
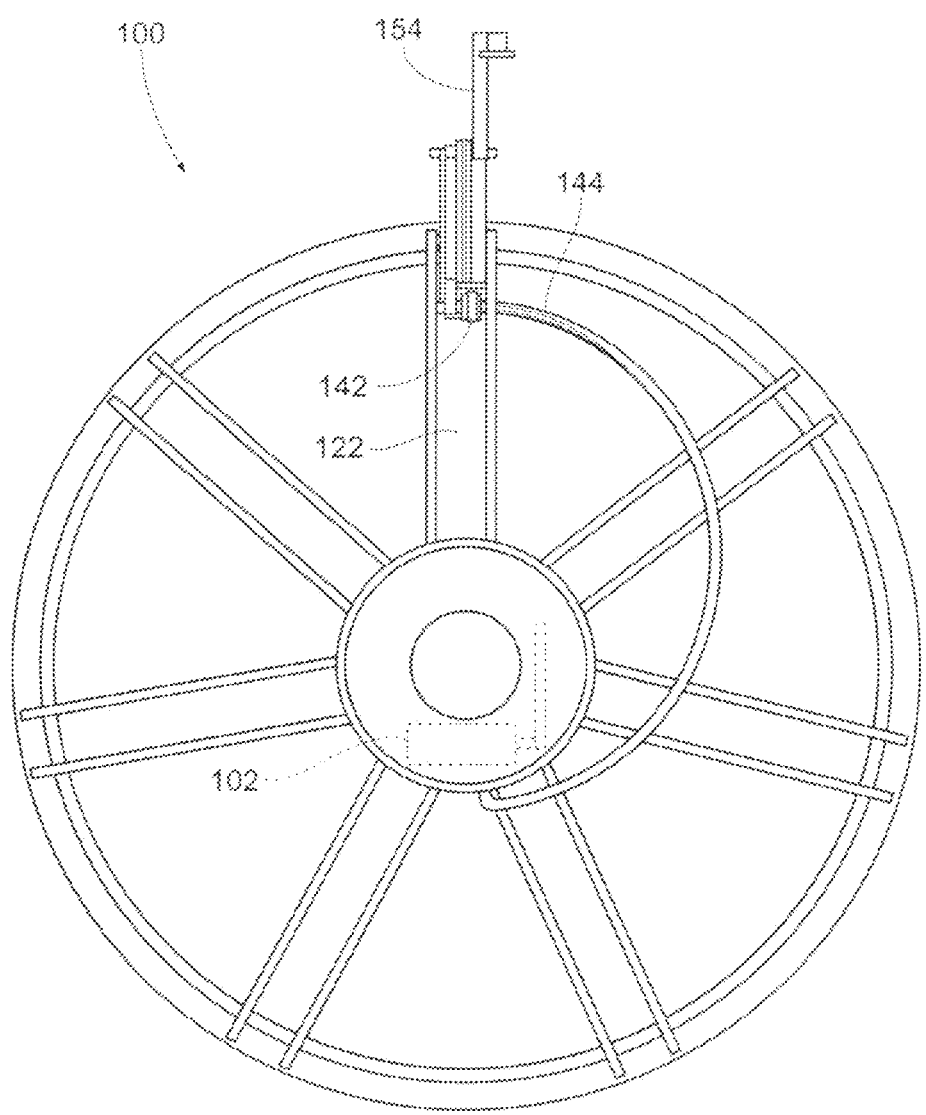
FIG. 5 is a side elevation view of the device shown in FIG. 4.

FIG. 5 is a side elevation view of the device 100. As is clearly shown, the channel 122 allows the cam member 142 and the gripping section 154 to slide smoothly and evenly along the arm 144, moving upwardly and downwardly within the channel 122. This provides for the necessary extension and retraction of the gripping section 154 from the tire 10 (see FIGS. 11A-15). The device 100 is preferably automated and a control device or panel 102 (shown in phantom) provides the necessary energy or force so that the attachment ring 130 will rotate with respect to the support ring 110.

Figures 6, 7:
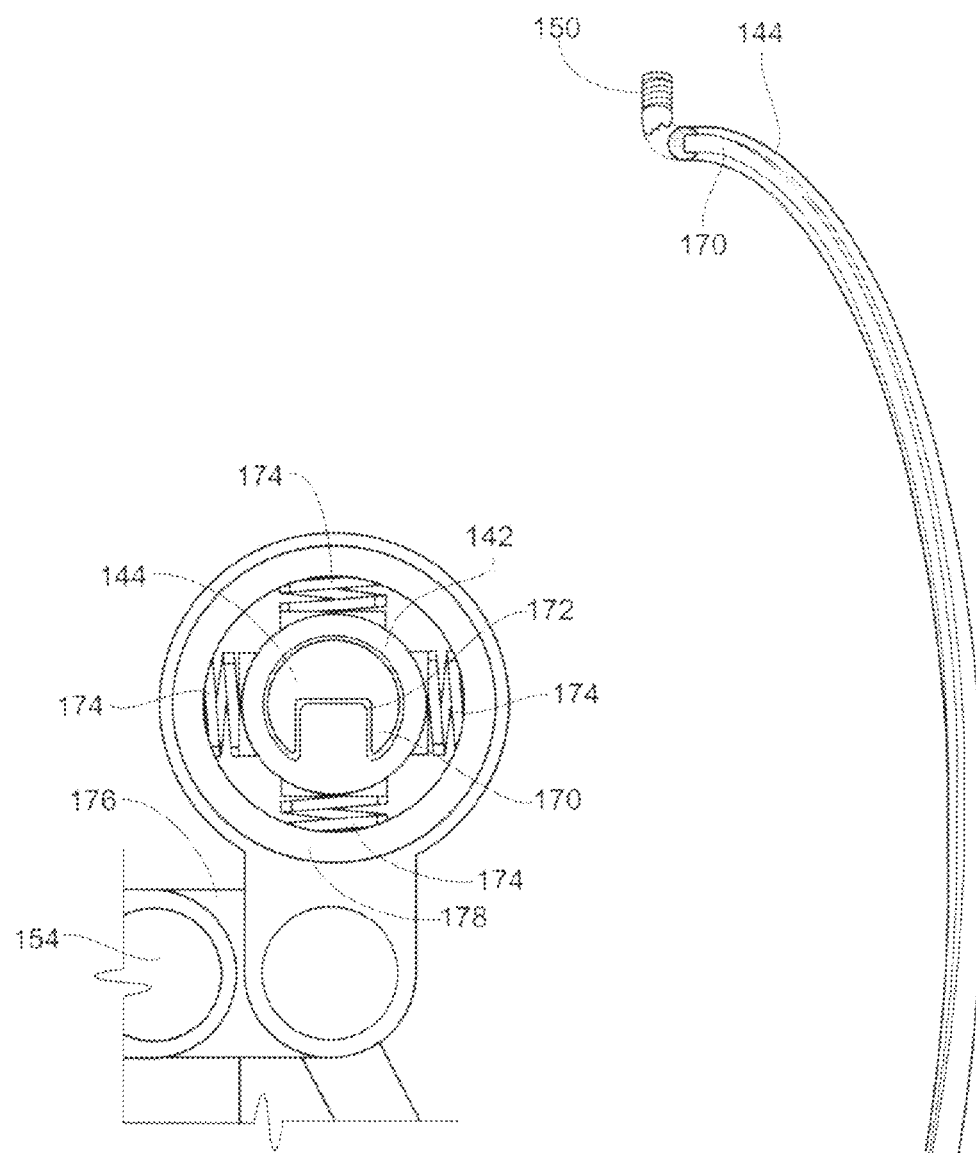
FIG. 6 is a close-up cross-sectional side view of a cam member with the cam member being attached to an arm used in the present invention.
FIG. 7 is a front perspective view of an arm used in the present invention.

FIG. 6 provides a close-up detailed side view of the cam member 142 and the arm 144. The arm 144 comprises a rail 170 which is arranged to slidingly engage an indent 172 located on the cam member 142. The rail 170 runs the entire length of the arm 144 (see FIG. 7) and slightly spirals along and around the length of the arm 144 to provide an over-center style securing arrangement for the cam member 142 when it moves up and down the arm 144. The arm 144 is balanced within a cam and arm support 178 by the use of biasing means, such as springs 174. The support 178 is connected to a brace 176, which is connected to the gripping section 154 (see FIG. 8) and, as will be shown in more detail with respect to FIGS. 8-15, assists in the movement of the gripping section 154 with respect to the tire 10.

Referring now to FIG. 7, the arm 144 supports the cam member 142. The indent 172 of the cam member 142 sits upon the rail 170 and is arranged so that it will slidingly move along the rail 170. As stated above, the rail 170 slightly spirals around the length of the arm 144, thereby providing the necessary rotation for the cam member 142 to move the gripping section 154 (see FIGS. 12-15). The springs 174 work together to keep the cam member 142 relatively centered on the arm 144 for smooth movement.

Figure 8:
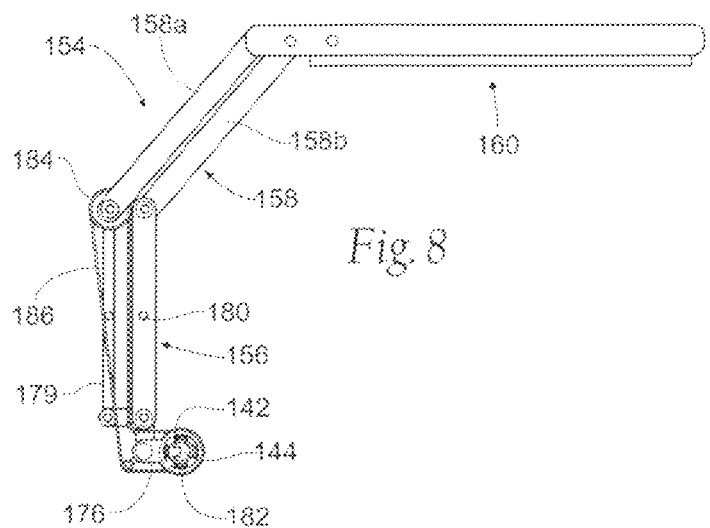
FIG. 8 is a front side elevation view of a gripping section used in connection with the present invention.
Figure 9:
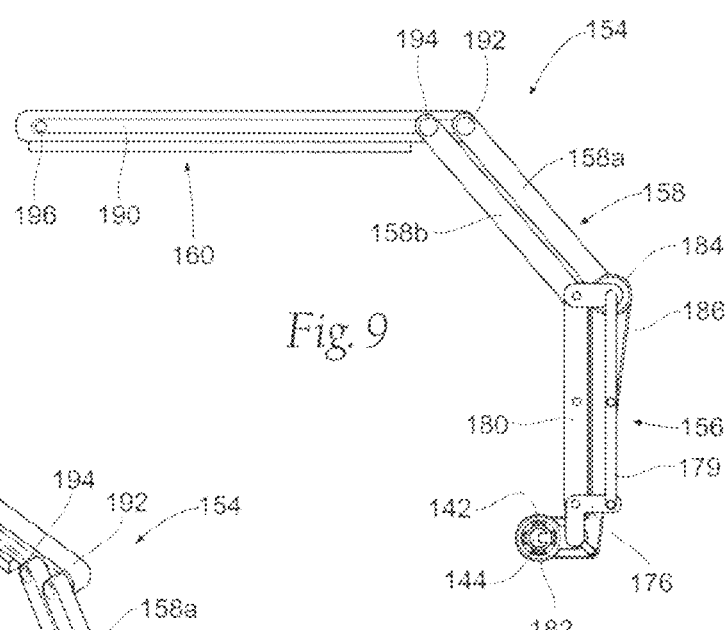
FIG. 9 is a rear side elevation view of the gripping section shown in FIG. 8.
Figure 10:
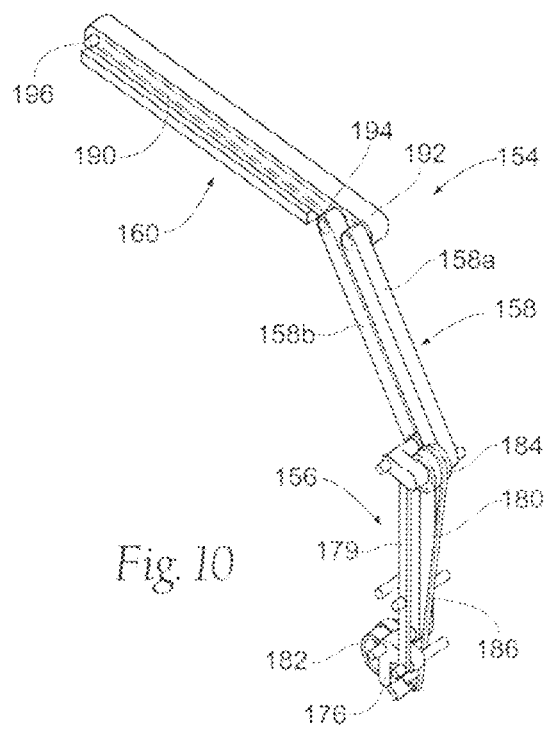
FIG. 10 is a perspective view of the gripping section shown in FIG. 8.

FIGS. 8-10 refer to the gripping section 154, which is shown in more detail. The gripping section 154 generally comprises a first section 156, a second section 158 and a third section 160. The first section 156 comprises a first support 179 and a second support 180, which are arranged generally parallel to one another. The first section 156 is supported by the brace 176, which connects the cam member 142 and the arm 144 to the gripping section 154 by way of the cam and arm support 178. The first support 179 is pivotally connected to a first bar 158a of the second section 158, and the second support 180 is pivotally connected to a second bar 158b of the second section 158. As with the first and second supports 179, 180, the first bar and second bar 158a, 158b are also preferably arranged in a parallel relationship, but will also move independently of one another. The second section 158 is connected to the third section 160 by way of a pair of pivots 192 and 194. The pivot 194 allows for the first bar 158a to be pivotally connected to the third section 160, and the pivot 194 allows for the second bar 158b to be slidingly connected to the third section 160. The pivot 194 is housed within a slot 190 located on the third section 160. A stop member 196 located at the end of the slot 190 prevents the pivot 194 and the second bar 158b from separating away from the third section 160.

Still referring to FIGS. 8-10, the cam and arm support 178 comprises a first pulley 182, and a second pulley 184 is located where the first support 179 is connected to the first bar 158a. A belt 186 runs around the pulleys 182, 184. As the first pulley 182 rotates, the belt 186 turns, thereby causing the second pulley 184 to turn, which allows the various sections of the gripping section 154 to move.

Figure 11A:
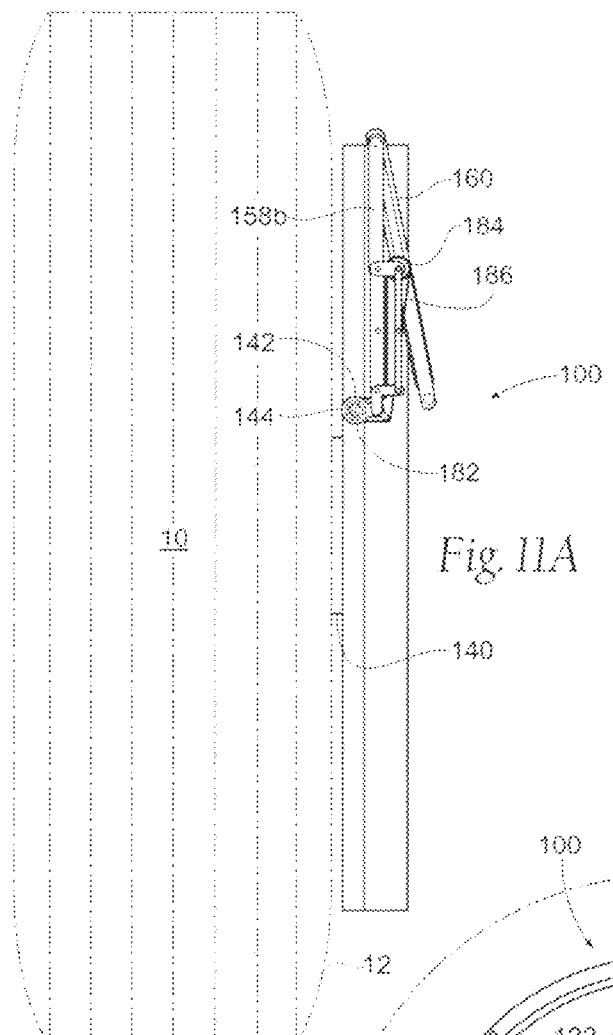
FIG. 11A is a side elevation view of a traction device according to the present invention in a retracted or stored position.
Figure 11B:
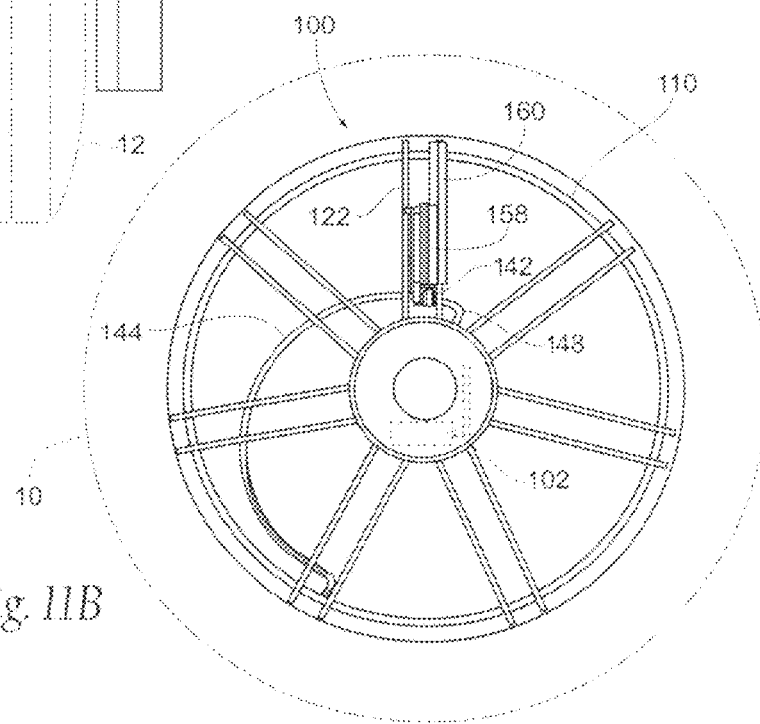
FIG. 11B is a front elevation view of the traction device of FIG. 11A.
Figure 12A:
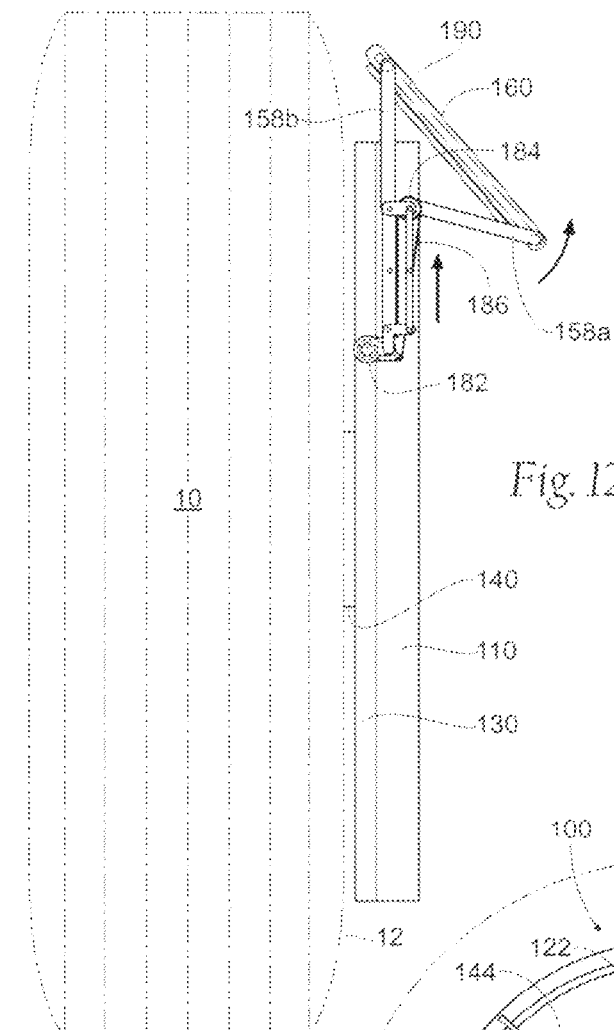
FIG. 12A is a side elevation view of the traction device shown in FIG. 11A in a partially extended position.
Figure 12B:
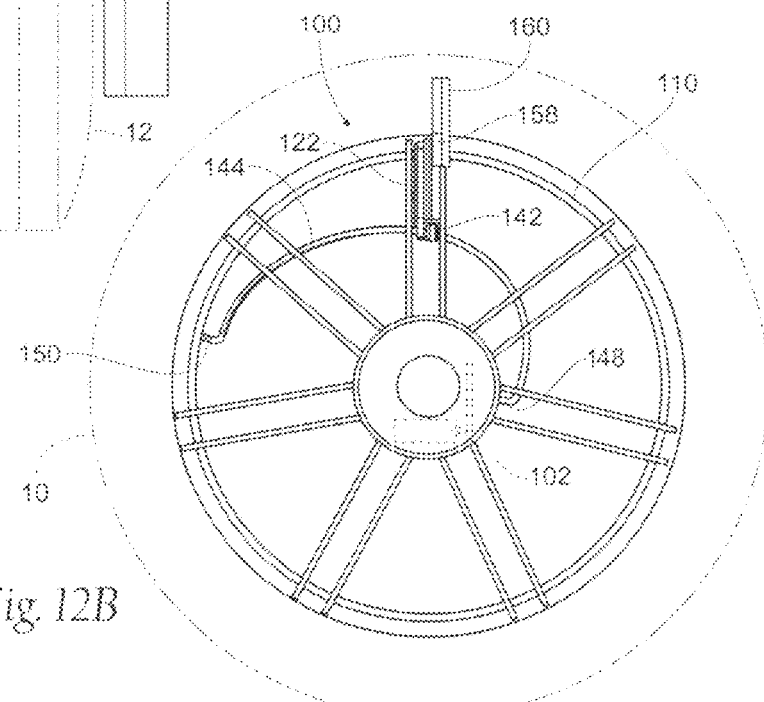
FIG. 12B is a front elevation view of the traction device of FIG. 12A.

FIGS. 11A-15 depict the device 100 in various positions as it moves to contact the surface of the tire 10 and retract into a stored position. FIGS. 11A and 11B show the device 100 in a stored position. The cam member 142 is located near the proximal end 148 of the arm 144. The third section 160 is in a retracted position, pulled inwardly along the first and second sections 156, 158. The second bar 158b is extended along the slot 190, with the pivot 194 being located near the stop member 196. The cam member 142 is located within the channel 122, located near the proximal end 148 of the arm 144.

The adaptor 140 is rotated in a first direction, preferably clockwise, which causes the cam member 142 to slide along the arm 144 from the proximal end 148 to the distal end 150. As the device 100 rotates, the cam member 142 slides upwardly within the channel 122 (FIGS. 12A and 12B), causing the first pulley 182 to rotate, which in turn causes the belt 186 to rotate the second pulley 184. The rotation of the pulley 182 is caused by cam member 142, which slides along the rail 170 (FIG. 7) of the arm 144. The first bar 158a of the second section 158 begins to move upwardly, which in turn begins to raise the third section 160. As the cam member 142 moves further upwardly in the channel 122 along the arm 144 and moves closer to the distal end 150 of the arm 144 (FIGS. 13A and 13B), the third section 160 begins to slide inwardly along the second bar 158b towards the tire 10. The second bar 158b keeps the third section 160 spaced sufficiently away from the tire 10 so that it will not interfere with the sidewall 12.

Figure 14A:
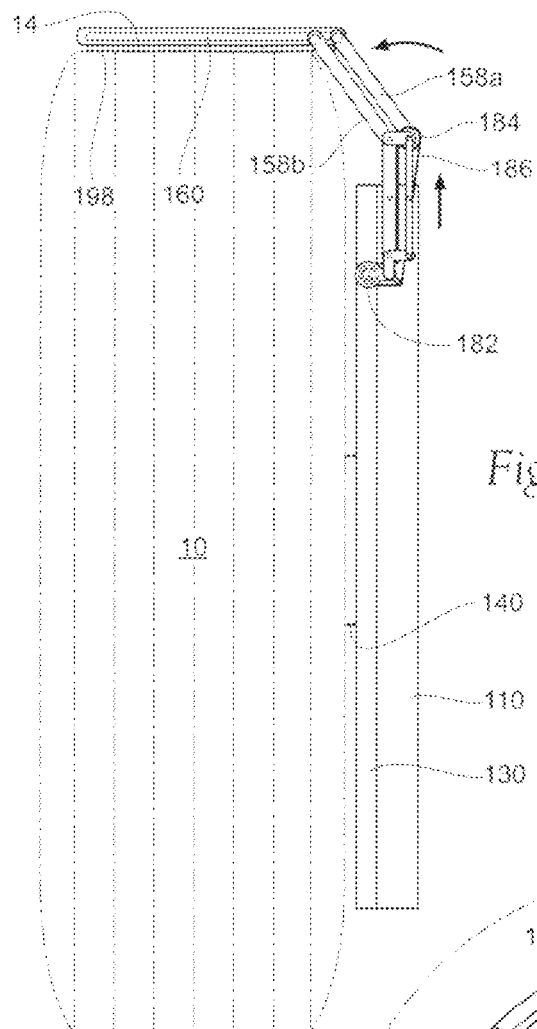
FIG. 14A is a side elevation view of the traction device shown in FIGS. 11A-13B making contact with a tire.
Figure 14B:
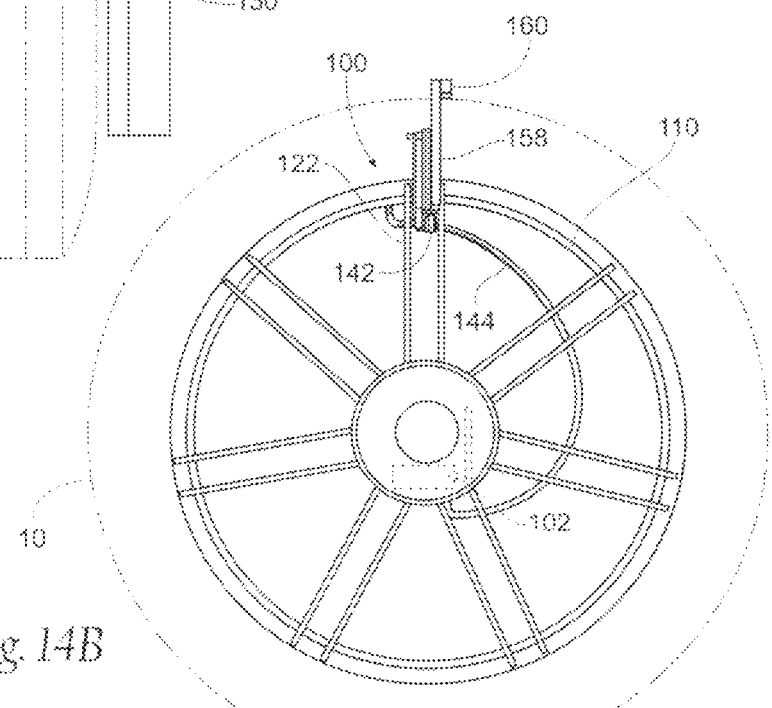
FIG. 14B is a front elevation view of the traction device shown in FIG. 14A.

Finally, as shown in FIGS. 14A and 14B, the cam member 142 rides upwardly along the arm 144 and ending proximate the distal end 150 of the arm 144 within the channel 122 (see also FIG. 5). The belt 186 has rotated the second pulley 184 sufficiently enough so that the third section 160 extends outwardly over the tread area 14 so that a contact surface 198 located on the third section 160 will come into contact with the tread area 14. The contact surface 198 may be made of any desired material that will provide sufficient gripping engagement with the tire 10. Preferably the contact surface 198 is a rubber material or similar material that will not damage the tread area 14. The device 100 is in position to give added traction for the tire 10. Once the device 100 is no longer needed for traction purposes, the rotation of the device 100 is reversed, thereby allowing the gripping section 154 to move to the stored position of FIGS. 11A and 11B. That is, by moving the adaptor 140 in a second direction, preferably a counter-clockwise direction, the cam member 142 will slide down the arm 144 within the channel 122, thereby allowing the gripping section 154 to retract from the tire 10.

As FIGS. 11A-14B show, the device 100 only requires movement of the cam member 142 generally in one direction. Because the cam member 142 is retained within the channel 122, the translation of the rotational movement of the cam member 142 along the arm 144 to the gripping section 154 is done easily and smoothly. Competing forces in different directions are minimized as the device 100 operates, thereby allowing easy extension and retraction of the device 100.

Figure 15:
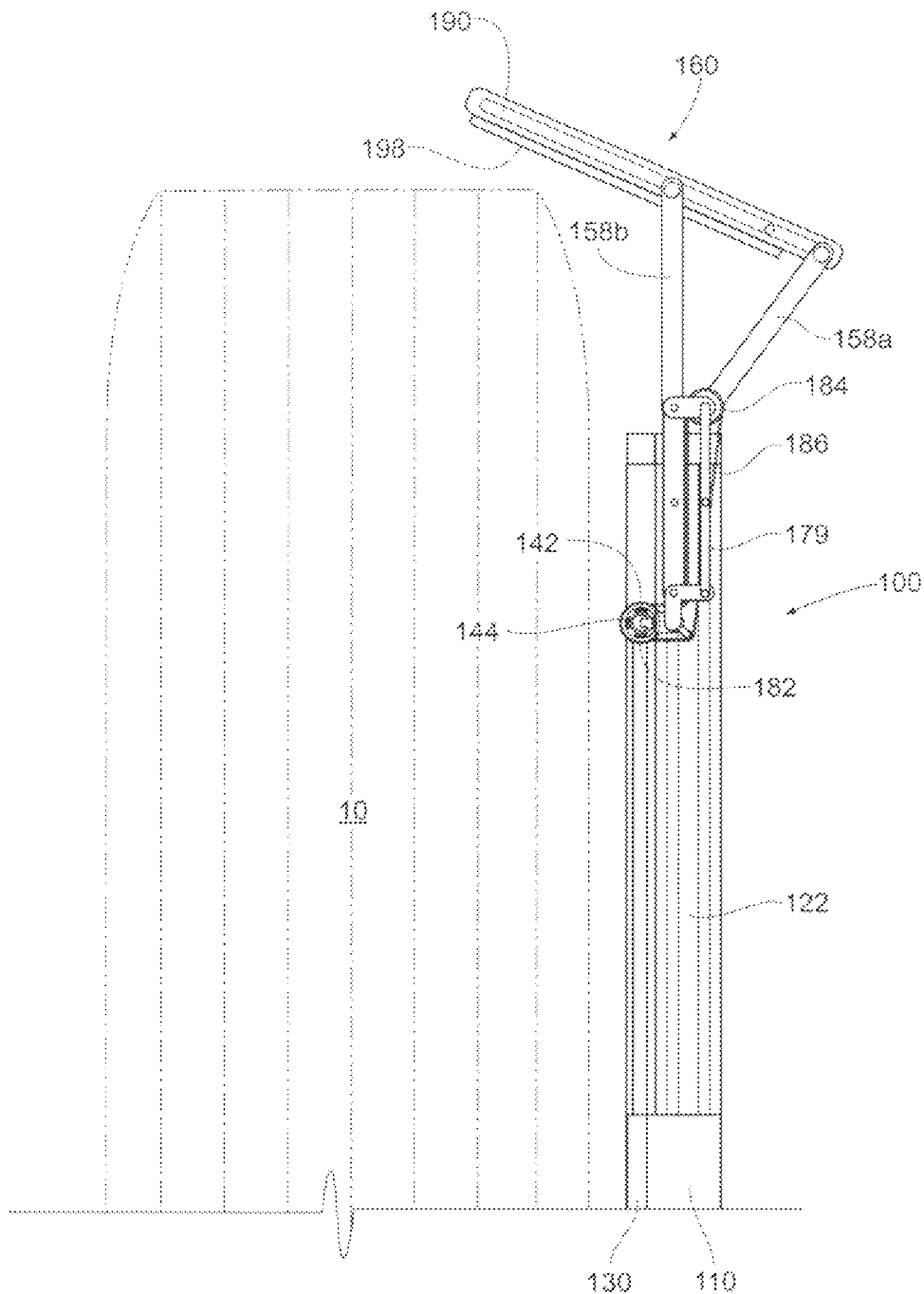
FIG. 15 is a close-up side elevation view of the gripping section used in the present invention.

FIG. 15 shows a close-up side view of the device 100, with the gripping section 154 partially extended. The cam member 142 slides upwardly and downwardly along the arm 144, positioned on the attachment ring. The channel 112 located in the support ring 110 further keeps the gripping section 154 and the cam member 142 properly aligned. The arrangement of the pulleys 182, 184 and the belt 186 allow for easy movement of the various section of the gripping section 154. Thus, the upward and downward movement of the cam member 142, in combination with the grooved arm 144, provides the necessary sideways movement so that the device will work as a gripping device 100, without burdensome attachment and securing means needed for coupling or joining the device onto or with the tire 10.

The gripping section 154 could be moved into and out of engagement in various fashions. It is understood that any arrangement that will allow extension and retraction of the gripping section 154 as discussed will fall within the scope of the present invention. For instance, mechanical, pneumatic, hydraulic, electrical, or other linkage or pulley arrangements could be incorporated into the movement of the device 100.

As previously noted, the device 100 can be actuated by any various types of arrangement, such as pneumatic, hydraulic, electrical, or mechanical means, or combinations thereof. Similarly, the cam and linkage system could be arranged differently and still fall within the system. For instance, it could be possible to use a system that incorporates gears rather than the pulley arrangement discussed above, or possibly a system that relies on pulleys and such rather than the cam arrangement. Also, the arms 144 could be of other designs than shown in the drawings and still fall within the scope of the invention. Provided that a traction device is provided that can be mounted on the wheel of a tire for an extended duration and is actuatable to engage the outside of the tire and, also, be reversed to disengage the tire, the device should fall within the scope of the invention.

The device is preferably activated with a remote control system, and preferably activated while someone is within the vehicle. That is, the control box 102 (see FIGS. 11A-14B) will be activated remotely to provide the necessary movement for the support ring 110 and the attachment ring 130 with respect to one another. Thus, a person would mount the device 100 on the wheel of a tire and not have to remove it for an extended time, without deleterious effects on the drive system of the vehicle. The device 30 could be mounted on the wheel of the tire at the beginning of winter and left on until the end of winter. The control box 102 could also be directly connected to an electronic stability control system, wherein the device 30 could be automatically deployed if necessary.

Figure 16:
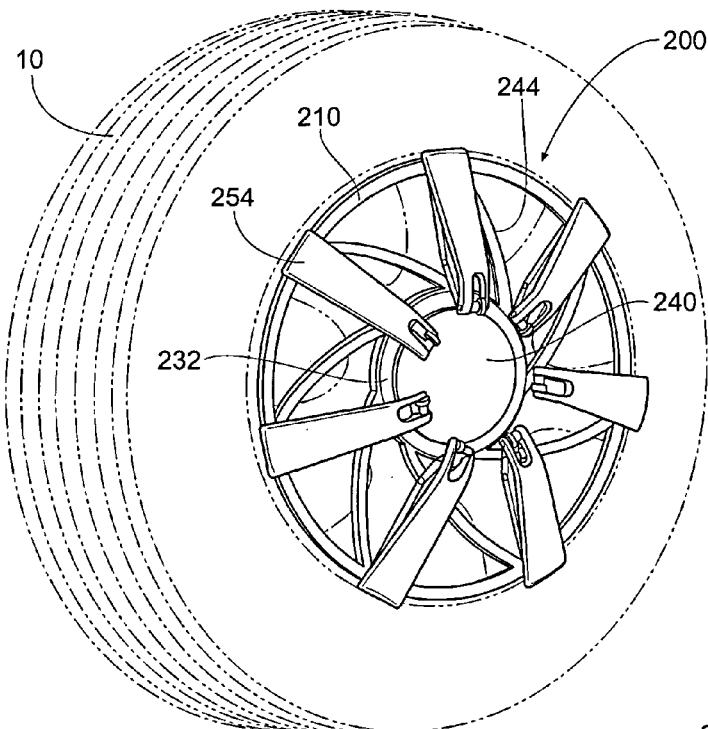
FIG. 16 is a perspective view of a second embodiment of a traction device according to the present invention in a stored position.

FIG. 16 provides a further embodiment 200 of a traction device according to the present invention. The traction device 200 comprises a support ring 210 having a plurality of arms 244 connected from the support ring 210 to a central hub 232. The central hub 232 is connected to an adaptor 240, which allows the device 200 to be rotatably attached to the wheel of the tire 10. The adaptor 240 and the support ring 210 can be connected as previously described. The support ring 210 also supports a plurality of gripping sections 254 that will come into gripping contact with the tire 10, as with the other embodiments of the traction device of the present invention. Similarly to the arms 144 of the previous embodiment, the support ring 210 and the arms 244 provide means for connecting the gripping sections to the central hub 232.

Figure 17:
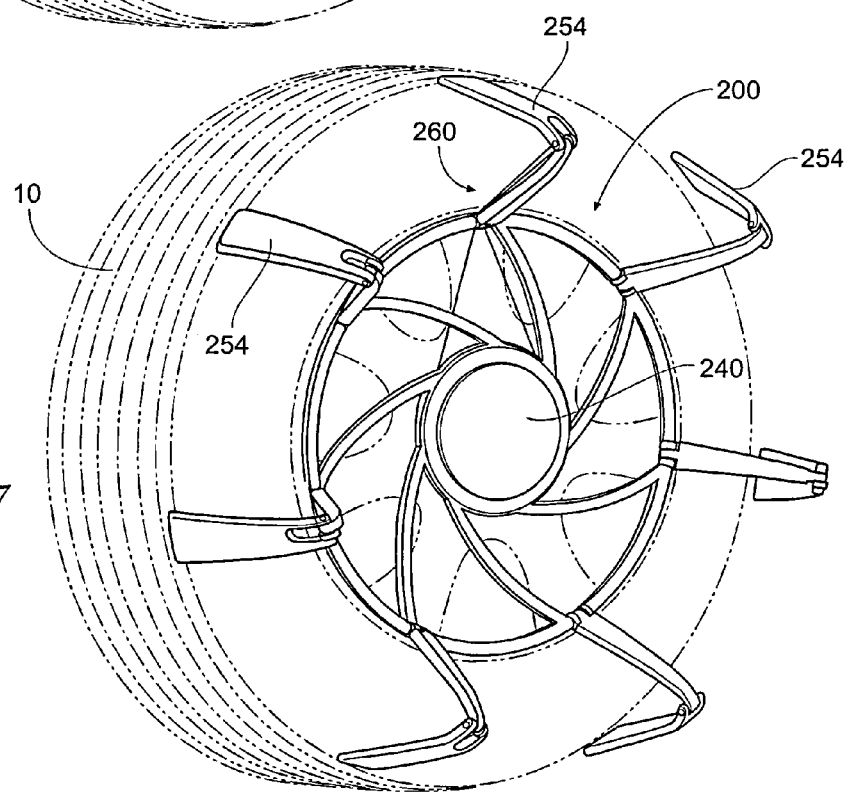
FIG. 17 is a perspective view of the embodiment of FIG. 16 in an extended position.

FIG. 17 shows the traction device 200 in a slightly extended position. As the adaptor 240 rotates, a pulley system 260 will turn around the adaptor 240, thereby extending the gripping sections 254, which are rotatably connected to the support ring 210. The pulley system 260 will work similarly to the pulley arrangement described with respect to FIGS. 8-10. While one pulley system 260 is shown, it is understood that a pulley system would be used with each of the gripping sections. Rotating the adaptor 240 in the opposite direction will cause the gripping sections 254 to retract, just as with the previous embodiments. Each of the gripping sections 254 are capable of moving with a pulley system 260, just as is demonstrated with the individual pulley system 260 shown in FIG. 17.

Figure 18:
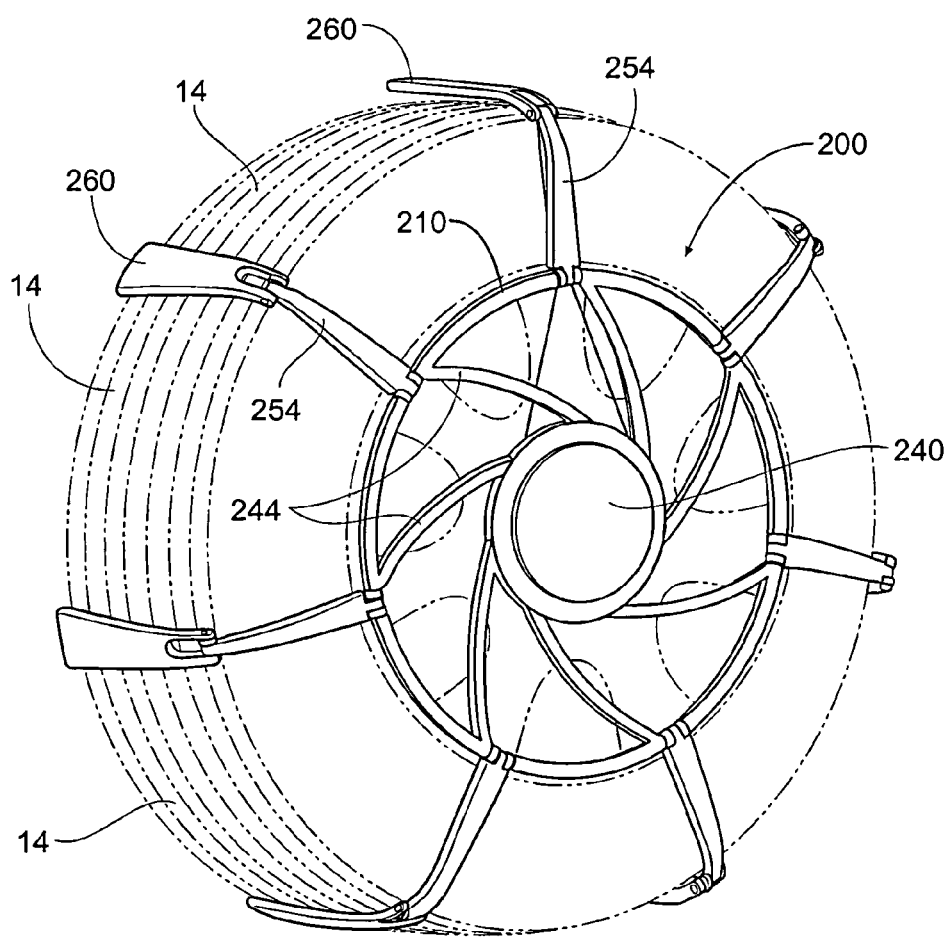
FIG. 18 is a perspective view of the embodiment of FIG. 16 making contact with a tire.

FIG. 18 shows the gripping sections 254 extended outwardly to engage the tread area 14 with a contact surface 260, as was described with the previous embodiments. Thus, the traction device 200 provides an alternate arrangement then what was is shown in the previous Figures, but still displays the features of the present invention. The reversible means for moving the gripping sections from a stored position to a contacting position have been demonstrated as being possibly different structures. Likewise, the gripping structures can be connected to the central hub and/or adaptor with different arrangements. FIGS. 16-18 demonstrate a traction device that can move from a stored position to a position in contact with tire, without the device needing to be removed from the wheel of the tire, and without the device needing to be adjusted so that the gripping sections of the device properly engage the tire.

The present invention could be sold as an after market device to be used on existing vehicle wheels or sold integral with the vehicle on its wheels, or sold with aftermarket wheels, with the device directly incorporated with wheels. Likewise, the present invention could be used in connection with an Electronic Stability Control (ESC) system, so that it is automatically deployed during necessary driving conditions. The dimensions of the traction device could be altered, as well, so that the device can be used on varying tire and axle arrangements. For example, the gripping sections of the device could be shortened so that the device could be used on the inner wheels and tires of parallel or dual tire arrangements, which are common on semis and other heavy duty vehicles.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A traction device for a tire having a treaded surface, said tire mounted on a wheel, said device comprising:
    a centrally located adaptor hub for attaching the traction device to the wheel;
    at least one arm having a proximal end and a distal end, said proximal end of said arm being connected to said adaptor hub;
    at least one gripping section, said gripping section having a portion thereof capable of contacting the treaded surface of said tire,
    said gripping section further comprises:
    a first section pivotably attached to said arm;
    a second section pivotally connected to said first section;
    a third section pivotally connected to said second section, said third section comprising said contacting portion of said gripping section; and
    at least one reversible rotatable cam slidable relative to said arm and pivotally supporting said gripping section.

2. The traction device according to claim 1 further comprising an attachment ring having an inner central hub for attachment to said adaptor hub, said arm attached to said attachment ring at said distal end.

3. The device according to claim 2 further including a support ring, said support ring having an inner support hub, said attachment ring being supported by said inner support hub of said support ring.

4. The traction device according to claim 1 wherein said contacting portion of said gripping section contacts said treaded surface when said cam is moved in a first direction radially outwardly relative to said arm, said contacting portion of said gripping section being released from said treaded section when said cam is moved radially inwardly relative to said arm.

5. The traction device according to claim 1 wherein said arm has a curvilinear shape.

6. The traction device according to claim 1 further comprising an attachment ring having an inner central hub for attachment to said adaptor hub, said arm attached to said attachment ring at said distal end.

7. The device according to claim 6 further including a support ring, said support ring having an inner support hub, said attachment ring being supported by said inner support hub of said support ring.

8. The traction device according to claim 1 wherein said contacting portion of said gripping section contacts said treaded surface when said attachment ring is rotated in a first direction, said contacting portion of said gripping section being released from said treaded surface when said attachment ring is rotated in a second direction.

9. The traction device according to claim 8 wherein said cam being slidable towards said proximal end of said arm when attachment ring is rotated in a second direction, said second directional movement of said cam removing said gripping sections from contact with said treaded surface.

10. The traction device according to claim 1 wherein said cam is slidingly attached to said arm, said cam being slidable towards said distal end of said arm when said attachment ring is rotated in a first direction, said first directional movement of said cam moving said gripping section into contact with said treaded surface.

11. A traction device for a tire having a treaded surface, said tire mounted on a wheel, said device comprising:
    an adaptor hub for attaching the traction device to the wheel;
    a plurality of gripping sections movable from a stored position to a contacting position with said treaded surface;
    said gripping sections being connected to said adaptor hub;
    a support ring coupled to said adaptor hub, said gripping sections rotatably connected to said support ring;
    a plurality of arms, each of said arms having a proximal end and a distal end, said arms extending radially outwardly from said adaptor hub;
    an attachment ring radially outwardly spaced from said adaptor hub; and
    reversible means for moving said gripping sections from said stored position to said contacting position, said reversible means further comprising a plurality of cams.

12. A traction device for a tire having a treaded surface, said tire mounted on a wheel, said device comprising:
    an adaptor hub for attaching the traction device to the wheel;
    a plurality of gripping sections movable from a stored position to a contacting position with said treaded surface;
    said gripping sections being connected to said adaptor hub;
    a support ring coupled to said adaptor hub, said gripping sections rotatably connected to said support ring,
    an attachment ring radially outwardly spaced from said adaptor hub; and
    reversible means for moving said gripping sections from said stored position to said contacting position, said reversible means further comprising a plurality of cams.

13. The traction device according to claim 12 wherein reversible moving means further comprises a plurality of pulley systems, each of said pulley systems movably connecting a gripping section to said hub.

14. The traction device according to claim 12, further comprising automatic means for controlling the traction device.

15. The traction device according to claim 12 in combination with said wheel.

* * * * *

UNITED STATES PATENT AND TRADEMARK OFFICE
CERTIFICATE OF CORRECTION

PATENT NO. : 8,439,096 B2
APPLICATION NO. : 12/800525
DATED : May 14, 2013
INVENTOR(S) : Ilias F. Maltezos Page 1 of 1

It is certified that error appears in the above-identified patent and that said Letters Patent is hereby corrected as shown below:

Title page item (74), line 1, Attorney, Agent, or Firm – delete "Ryan Krumholz & Manion, S.C." and substitute -- Ryan Kromholz & Manion, S.C. --

Title page item (56), line 3, Other Publications "Search Report/Written Opinion dated Sep. 8, 2011 in International Patent Application Serial No." delete "PCT/U32011/036642" and substitute -- PCT/US2011/036642 --

Signed and Sealed this
Sixteenth Day of July, 2013

Teresa Stanek Rea
*Acting Director of the United States Patent and Trademark Office*